United States Patent
Luther et al.

(10) Patent No.: US 9,366,024 B2
(45) Date of Patent: Jun. 14, 2016

(54) INSULATING MATERIAL

(71) Applicant: ContiTech Elastomer-Beschichtungen GmbH, Hannover (DE)

(72) Inventors: Sabine Luther, Hannover (DE); Jens Storre, Noerten-Hardenberg (DE); Andreas Fleck, Garbsen (DE); Alexander Papadimitriou, Northeim (DE); Hans-Peter Paulsen, Goettingen (DE)

(73) Assignee: ContiTech Elastomer-Beschichtungen GmbH, Hannover (DE)

( * ) Notice: Subject to any disclaimer, the term of this patent is extended or adjusted under 35 U.S.C. 154(b) by 147 days.

(21) Appl. No.: 14/098,086

(22) Filed: Dec. 5, 2013

(65) Prior Publication Data
US 2014/0091248 A1  Apr. 3, 2014

Related U.S. Application Data

(63) Continuation of application No. PCT/EP2012/059548, filed on May 23, 2012.

(30) Foreign Application Priority Data

Jun. 24, 2011  (EP) .................... 11171302

(51) Int. Cl.
*E04B 1/88* (2006.01)
*H01B 3/46* (2006.01)
*C08K 7/28* (2006.01)
*C08L 83/04* (2006.01)

(52) U.S. Cl.
CPC ... *E04B 1/88* (2013.01); *C08K 7/28* (2013.01); *H01B 3/46* (2013.01); *C08L 83/04* (2013.01)

(58) Field of Classification Search
CPC .............. C08K 7/28; C08K 5/14; E04B 1/88; H01B 3/46; C08L 83/04; C08L 21/00; C08L 83/00

See application file for complete search history.

(56) References Cited

U.S. PATENT DOCUMENTS

| | | | |
|---|---|---|---|
| 6,323,262 B1 * | 11/2001 | Achenbach et al. | 523/343 |
| 6,790,533 B2 | 9/2004 | Reitmeier et al. | |
| 7,563,855 B2 * | 7/2009 | Jerschow et al. | 528/15 |
| 7,862,797 B2 * | 1/2011 | Schumacher et al. | 423/593.1 |
| 2009/0139181 A1 | 6/2009 | Bowe et al. | |
| 2013/0042974 A1 * | 2/2013 | Luther et al. | 156/275.5 |

FOREIGN PATENT DOCUMENTS

| GB | 2 249 753 A | 5/1992 |
|---|---|---|
| WO | WO2011/154488 | * 12/2011 |

OTHER PUBLICATIONS

International Search Report dated Oct. 19, 2012 of international application PCT/EP2012/059548.

* cited by examiner

*Primary Examiner* — Irina S Zemel
(74) *Attorney, Agent, or Firm* — Walter Ottesen, P.A.

(57) ABSTRACT

The invention relates to a flexible insulating material based on a high temperature resistant rubber mixture. The insulation material for use at temperatures of more than 130° C., which is easy to apply to complex components to be insulated and also fills in undercuts, is an insulation material in which at least a portion of the rubber mixture is not crosslinked and can be plastically deformed, wherein the Mooney viscosity ML(1+4) of the mixture, determined at 23° C. according to DIN 53523 Part 3, is 5 to 20 MU.

7 Claims, No Drawings

INSULATING MATERIAL

CROSS REFERENCE TO RELATED APPLICATIONS

This application is a continuation application of international patent application PCT/EP2012/059548, filed May 23, 2012, designating the United States and claiming priority from European application 11171302.0, filed Jun. 24, 2011, and the entire content of both applications is incorporated herein by reference.

FIELD OF THE INVENTION

The invention relates to a flexible insulating material based on a rubber mixture having high temperature resistance.

BACKGROUND OF THE INVENTION

The market offers only a few solutions for the thermal and/or acoustic insulation of components, in particular of components with complex geometries, where these can also be used at temperatures above 130° C., in particular above 150° C. Insulation of components at these high temperatures is usually achieved by using mineral wools which are additionally laminated with sheet metal or adhesive tape and thus stabilized. Insulating materials of this type, made of mineral wool with materials laminated thereto, have the following disadvantages: installation or application to the component requiring insulation, and fixing, is inconvenient and therefore expensive. It is very difficult to achieve insulation of complex components (molded sections) because the mineral wool with the necessary material laminated thereto (sheathing) has low flexibility. Mineral wools are absorbent, and in the event of escape of, or unintended wetting with, liquids or if condensation occurs this absorbency can sometimes lead to loss of insulating effect and, in the case of combustible liquids such as oils, can even lead to spontaneous ignition. Application of the mineral wool to the component requiring insulation can moreover release fibers and/or fiber dust, and these can lead to respiratory disorders if exposure is prolonged.

Alternative insulating materials based on polymers, e.g. self-expanding sealing tapes, or preformed insulating materials based on EPDM with closed cell structure, generally have usage temperatures restricted to ranges up to at most 130° C. or from 150 to 160° C.

GB 2 249 753 A describes a flexible material in the form of a web for the thermal insulation by way of example of hoses at extremely high temperatures, which comprises a metal foil and a layer made of an optionally foamed silicone rubber. Other textile layers can be provided. The silicone rubber layer is always crosslinked before application to the component requiring insulation. The rubber layer here is usually applied in the form of paste or solution, dried, and then crosslinked. Because of the prior crosslinking, the material then generally has no plastic deformability, since the crosslinking (vulcanization) converts the elastomer from the plastic to the elastic state. The material cannot therefore conform in ideal fashion to very complex component geometries, and is often unable to retain the desired position.

Even if flexible insulating material in the form of a web is plastically deformable it often has the disadvantage that when the material in the form of a web is used for wrapping it is not possible to fill undercuts on complex components, such as fittings or valves, with the insulating material.

SUMMARY OF THE INVENTION

It is therefore an object of the invention to provide an insulating material for use at temperatures above 130° C. which can easily be applied to complex components requiring insulation and also fills undercuts.

This object is achieved in the invention in that the rubber mixture is at least to some extent uncrosslinked and plastically deformable, and has a Mooney viscosity ML(1+4) of from 5 to 20 MU at 23° C., determined in accordance with DIN 53523 Part 3.

The expression "to some extent uncrosslinked" here means not only a rubber mixture which still comprises unconsumed crosslinking chemicals but also a rubber mixture which has been crosslinked with small amounts of, or even no, crosslinking chemicals, but still comprises at least crosslinkable polymer constituents.

By virtue of the plastic deformability with low Mooney viscosity ML(1+4) of from 5 to 20 MU at 23° C., it is possible to achieve success even with complicated and complex component geometries, e.g. valves, heat exchangers, or piping systems, in enveloping these completely with the insulating material, and also filling undercuts. Because of low viscosity, the insulating material here can easily be forced or pressed onto the component requiring insulation by a machine or even by an inexpensive manual method. It can be used like dough at room temperature, and provides a simple and rapid method for durable manual insulation of complex components. The insulating material can also be forced into the smallest apertures and undercuts.

Other advantages provided by an insulating material of this type are that, unlike by way of example mineral wool, it is not absorbent, and when applied it does not release any mineral fibers or fiber dusts that are hazardous to health.

The usage range at high temperatures is ensured by the use of a rubber mixture having high temperature resistance.

The insulating material then serves to reduce heat losses, to provide protection from contact burns, or else for acoustic insulation. The insulating material can also be used for electrical insulation, and indeed in flame-retardant form.

The insulating material comprising the at least to some extent uncrosslinked and plastically deformable rubber mixture and applied to the component requiring insulation can, after application, be crosslinked or, respectively, further crosslinked via exposure to heat and/or radiation. The insulating material therefore remains crosslinkable after application. The radiation can be IR radiation, microwaves, or other high-energy radiation. Exposure to heat can by way of example be achieved via heating with hot air by a hot-air blower. However, in a possible crosslinking method that is simple and rapid, the exposure to heat is achieved via the component requiring insulation. The intrinsic heat provided by the component requiring insulation brings about crosslinking.

The subsequent crosslinking fixes the insulating material in its position in a manner that is stable over long periods, since the rubber mixture is converted from the plastic to the elastic state during crosslinking. This gives an elastomeric insulating component which can also be reused after dismantling, at the same location or at another location for a component of the same design that requires insulation.

In one advantageous embodiment of the invention, on application of the insulating material to the components requiring insulation the adhesion of the rubber mixture is sufficiently high to prevent any separation of the material from the component surface due to the resilience of the insulating material. By virtue of the adhesion of the insulating material, it then continues to adhere on the surface requiring insulation, and also to itself, and ensures simple fixing in the desired position.

In order to improve thermal or else acoustic insulation properties, the rubber mixture advantageously has a pore structure. This pore structure can be achieved via the use of chemical blowing agents or microspheres incorporated by mixing into the rubber mixture. Blowing agents that can be used are not only inorganic but also organic compounds. The microspheres are hollow spheres with a diameter in the μm range made of glass, phenolic resin, carbon, or of thermoplastic material. Some of these are available in expandable form, where they have been filled with a blowing agent and expand on heating, or in pre-expanded form, where the expansion has already been concluded. Microspheres of this type are by way of example marketed as Expancel® by Akzo Nobel.

In order to form a pore structure with particularly good insulation properties, it is preferable to add from 2 to 100 phr of microspheres to the rubber mixture. Microspheres have the advantage of forming a closed pore structure which has better suitability for insulation purposes, because there is less convection within the pores. The greater the quantity of expanded microspheres, the better the insulation effect, by virtue of the greater proportion of pores. However, excessive quantities of microspheres can cause process-technology problems in mixture production or mixture processing. The insulating material loses strength, and on application to the components requiring insulation this is disadvantageous.

The rubber mixture of the insulating material preferably comprises from 2 to 15 phr of expanded microspheres made of thermoplastic material. These microspheres are very light, and even this small quantity added brings about formation of an adequate pore structure, without any adverse effect on the deformability and the adhesion of the rubber mixture.

In one alternative embodiment, the rubber mixture comprises from 10 to 100 phr of microspheres made of glass. This variant can give an insulating material with greater physical stability and lower compressibility, since microspheres made of glass, unlike microspheres made of thermoplastic material, cannot be compressed.

The insulating material is based on a rubber mixture having high temperature resistance. Examples of rubbers that can be used here are silicone rubber, hydrogenated nitrile rubber (HNBR), fluororubber, acrylate rubber, ethylene-acrylate co- and terpolymers, ethylene-propylene-diene rubber, epichlorohydrin rubber, and blends made of these. The rubber mixture is preferably based on silicone rubber, since this rubber has particularly high heat resistance, plastic deformability, and a certain level of adhesion. Preference is given to HTV types, which can be either peroxidically crosslinkable or else addition-crosslinkable. The silicone rubber can also be used as premix made of polymer, filler, and oil, as conventionally marketed.

In order to achieve a favorable effect on the viscosity of silicone-rubber-based rubber mixture, the rubber mixture preferably comprises at least 10 phr of silicone oil. This has good compatibility with the silicone rubber, and permits adjustment to a dough-like consistency that can be deformed manually.

In one advantageous embodiment of the invention, the rubber mixture of the insulating material comprises a black pigment preparation. Surprisingly, it has been found that this black pigment preparation can increase the adhesion of the material. The black pigments can by way of example be carbon black, iron oxide, or a mixture thereof. Examples of black pigment preparations that can be used are Elastosil® color pastes, for example Elastosil® PT Black Standard color paste, Elastosil® Deep Black RAL 9005 color paste, etc., and also Elastosil® stabilizer H3, from Wacker Chemie AG, Germany.

In order to improve flame retardancy, the rubber mixture of the insulating material advantageously comprises a flame retardant. Surprisingly, it has also been found that the flame retardants increase the adhesion of the material.

The insulating material of the invention can be produced by processes known to the person skilled in the art, where a rubber mixture with all of the necessary additional substances is produced and then the mixture is divided into portions. The insulating material can be offered for supply in a very wide variety of forms, e.g. in the form of beads, strands, strips, webs, or tapes.

DESCRIPTION OF THE PREFERRED EMBODIMENTS OF THE INVENTION

An embodiment will be used for further explanation of the invention, without any resultant restriction thereof.

A silicone-rubber-based rubber mixture 1 was produced with the composition described in Table 1. One column of the table states the possible quantity ranges for a silicone-rubber-based insulating material of the invention. The phr (parts per hundred parts of rubber by weight) data used in this document are the conventional quantitative data used in the rubber industry for mixture formulations. The quantities added in parts by weight of the individual substances here are always based on 100 parts by weight of the entire composition of all of the rubbers present in the mixture. The Mooney viscosity of the mixture was moreover measured at 23° C. after 7 days in accordance with DIN 53523 Part 3. Table 1 lists, as comparison, a silicone rubber mixture 2 which does not have the required Mooney viscosity and which therefore does not permit manual application of the material in order to fill undercuts.

TABLE 1

| Substance | Mixture 1 | Possible quantity ranges | Comparative mixture 2 |
|---|---|---|---|
| Silicone rubber[a] | 100 | 100 | 100 |
| Heat stabilizers | 0.56 | 0-6 | 1.95 |
| Flame retardants[b] | 2.41 | 0-6 | — |
| Processing aids | 0.74 | 0-3 | 0.3 |
| Peroxide crosslinking agents | 2.04 | 1-4 | 1.05 |
| Silicone oil | 12.99 | 2-20 | 9.30 |
| Pre-expanded microspheres[c] | 5.57 | 2-15 | 5.58 |
| Expandable micropheres[d] | — | — | 1.5 |
| Pigment preparation[e] | 9.28 | 0-12 | — |
| Mooney viscosity ML(1 + 4) at 23° C. | 7 MU | 5-20 MU | >25 MU |

[a]Elastosil ® R 401/30 S, Wacker Chemie AG, Germany for mixture 1, Elastosil ® R 420/50 S, Wacker Chemie AG, Germany for mixture 2
[b]Elastosil ® Aux SB2 masterbatch, Wacker Chemie AG, Germany
[c]Expancel ® 920 DE 40 d30, Akzo Nobel N.V., The Netherlands
[d]Expancel ® 920 DU 80, Akzo Nobel N.V., The Netherlands
[e]Elastosil ® PT Black Standard color paste, Wacker Chemie AG, Germany The insulating material of the mixture 1 features a uniform closed pore structure due to the use of the pre-expanded microspheres. Its thermal conductivity is 0.1 W/(m*K), and it therefore has good insulation properties.

The insulating material of the invention, unlike comparative mixture 2, could be used like dough at room temperature, and the insulating material could be provided manually to the entire surface of complex components with undercuts, and with small apertures, or gaps, thus permitting achievement of the best possible insulation. The material has the adhesion required for good adhesion on the individual components.

The insulating material of the mixture 1 provides excellent thermal and acoustic insulation even at temperatures above 130° C. The mixture 1 was used for manual insulation of various types of piping, flanges, and valves through which fluids passed at up to 200° C. The insulating mixture vulcanized by the heat of the fluid flowing through the equipment could be removed and then attached again with identical insulation effect.

It is understood that the foregoing description is that of the preferred embodiments of the invention and that various changes and modifications may be made thereto without departing from the spirit and scope of the invention as defined in the appended claims.

What is claimed is:

1. A flexible insulating material based on a rubber mixture having high temperature resistance,
    wherein the rubber mixture is at least to some extent uncrosslinked and plastically deformable, and has a Mooney viscosity ML(1+4) of from 5 to 20 MU at 23° C., determined in accordance with DIN 53523 Part 3;
    wherein the rubber mixture has a pore structure;
    wherein the rubber mixture is based on silicone rubber; and,
    wherein the rubber mixture comprises from 2 to 100 phr of microspheres in order to form the pore structure.

2. The insulating material as claimed in claim 1, wherein on application of the insulating material to the components requiring insulation the adhesion of the rubber mixture is sufficiently high to prevent any separation of the material from the component surface due to the resilience of the insulating material.

3. The insulating material as claimed in claim 1, wherein the rubber mixture comprises from 2 to 15 phr of expanded microspheres made of thermoplastic material in order to form the pore structure.

4. The insulating material as claimed in claim 1, wherein the rubber mixture comprises from 10 to 100 phr of microspheres made of glass in order to form the pore structure.

5. The insulating material as claimed in claim 1, wherein the rubber mixture comprises at least 10 phr of silicone oil.

6. The insulating material as claimed in claim 1, wherein the rubber mixture comprises a black pigment preparation.

7. The insulating material as claimed in claim 1, wherein the rubber mixture comprises a flame retardant.

* * * * *